United States Patent [19]
Zich et al.

[11] Patent Number: 5,269,465
[45] Date of Patent: Dec. 14, 1993

[54] LIQUID DISTRIBUTOR TRAY FOR HEAT EXCHANGE EQUIPMENT

[75] Inventors: Egon Zich, Leichlingen; Helmut Jansen, Hilden; Thomas Rietfort, Bottrop; Jochen Leben, Düsseldorf, all of Fed. Rep. of Germany

[73] Assignee: Julius Montz GmbH, Hilden, Fed. Rep. of Germany

[21] Appl. No.: 876,234

[22] Filed: Apr. 30, 1992

[30] Foreign Application Priority Data

May 2, 1991 [DE] Fed. Rep. of Germany ....... 4114278

[51] Int. Cl.$^5$ .................... B01J 14/00; B01D 3/20
[52] U.S. Cl. .................... 239/193; 261/97; 261/DIG. 44
[58] Field of Search ............ 239/193; 261/DIG. 44, 261/97, 110

[56] References Cited

U.S. PATENT DOCUMENTS

| | | | |
|---|---|---|---|
| 3,360,246 | 12/1967 | Eckert | 261/97 |
| 4,264,538 | 4/1981 | Moore et al. | 261/97 |
| 4,479,909 | 10/1984 | Streuber | 239/193 |

FOREIGN PATENT DOCUMENTS

| | | |
|---|---|---|
| 2206230 | 8/1973 | Fed. Rep. of Germany . |
| 2945103 | 5/1981 | Fed. Rep. of Germany ........ 261/97 |
| 3013783 | 10/1981 | Fed. Rep. of Germany ........ 261/97 |
| 3306636 | 8/1984 | Fed. Rep. of Germany . |
| 2752391 | 3/1985 | Fed. Rep. of Germany . |
| 3409524 | 9/1985 | Fed. Rep. of Germany ........ 261/97 |

Primary Examiner—Andres Kashnikow
Assistant Examiner—Karen B. Merritt
Attorney, Agent, or Firm—Herbert Dubno

[57] ABSTRACT

A liquid distributor tray in heat exchange equipment, mass exchange equipment or reactors having roughly horizontal liquid distributor channels disposed in the tray, which channels, via openings, deliver the liquid downwards to fingers from which the liquid flows off and/or drips off. Below the channel base one pot or a plurality of pots are located which receive the liquid leaving the channel. The fingers, which are bent outwards, are attached or formed on at the lower edge of the pot wall. Openings are located above the fingers in the pot wall through which the liquid passes outwardly and flows down the outer wall of the pot to the fingers.

3 Claims, 3 Drawing Sheets

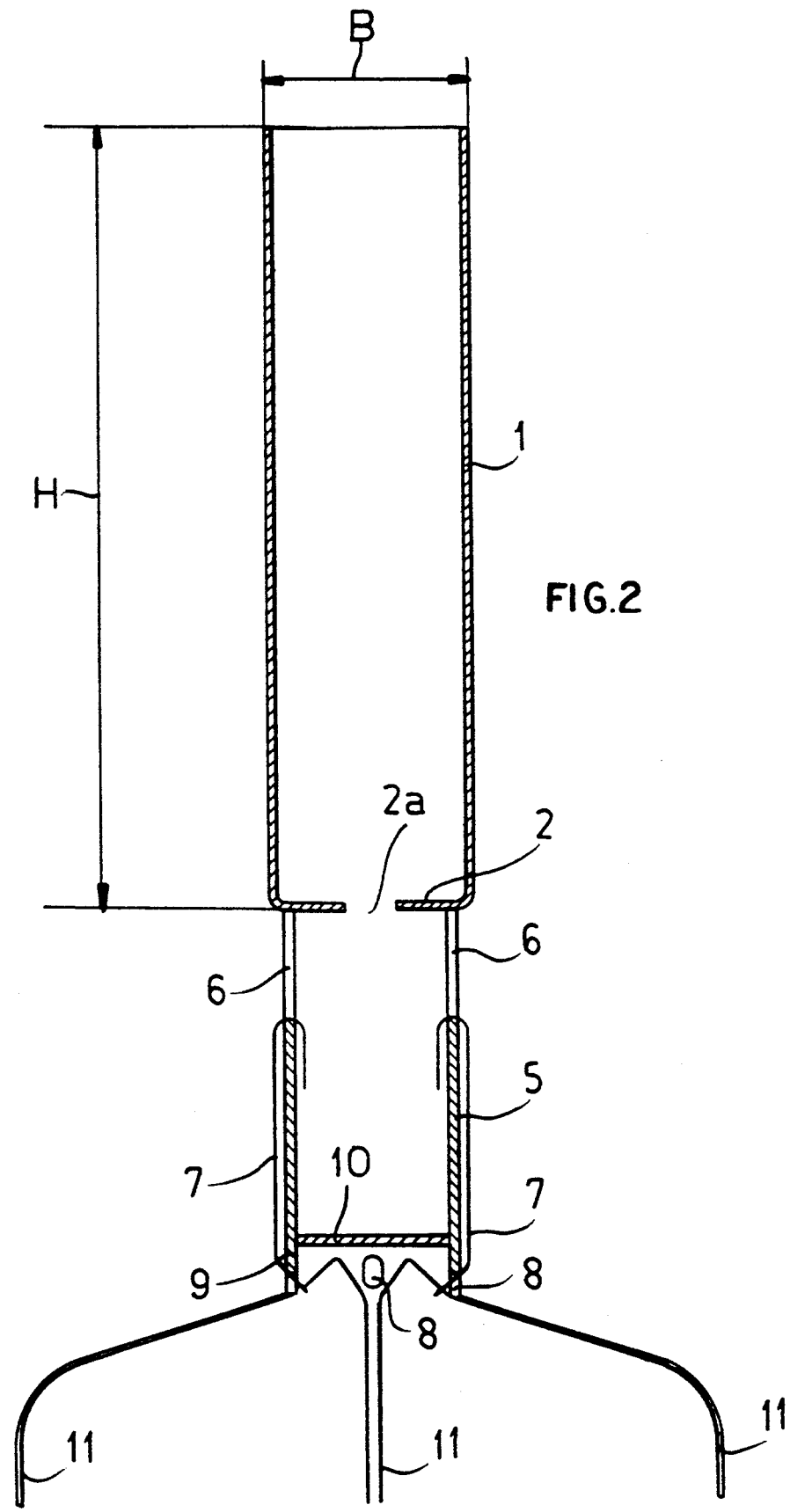

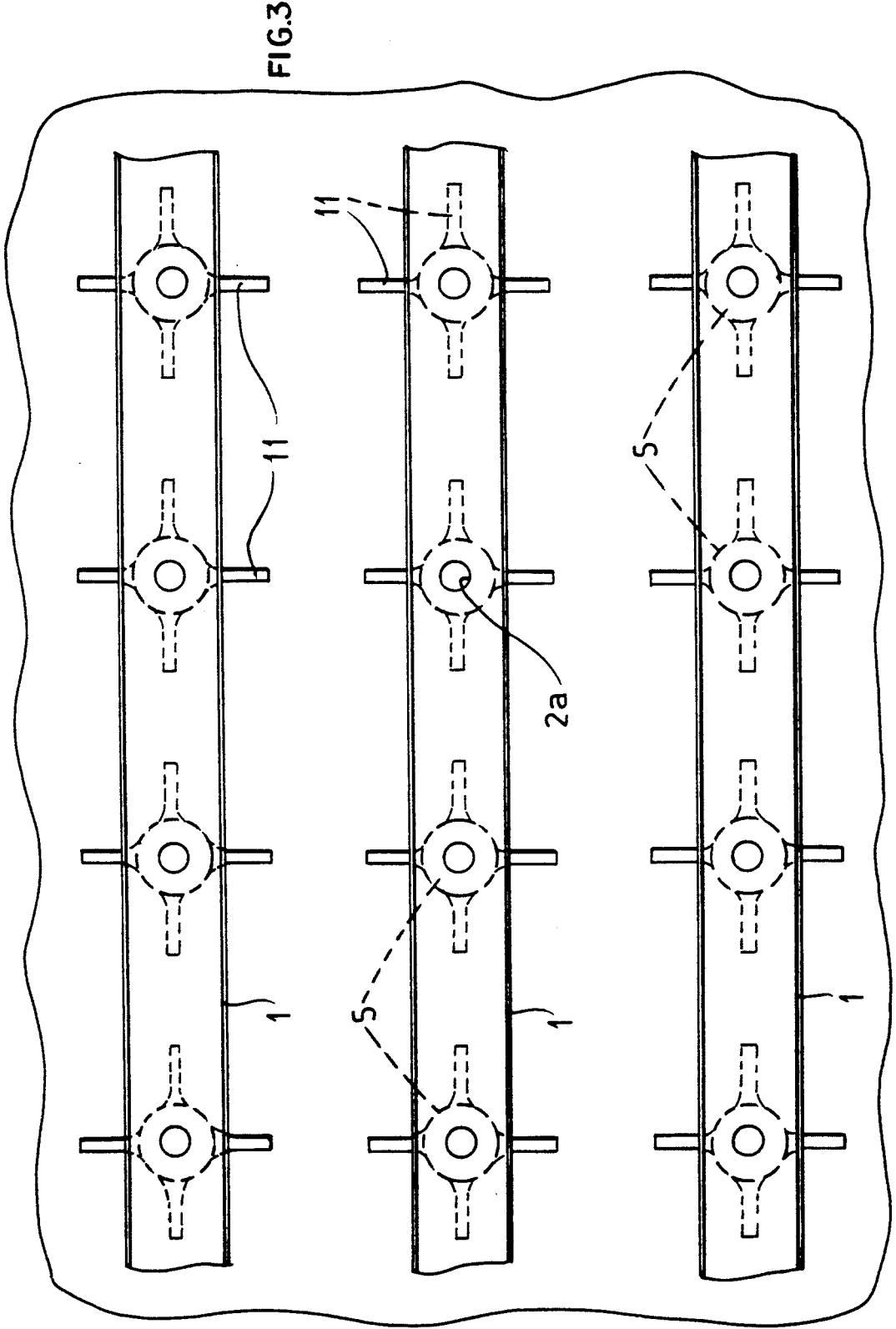

LIQUID DISTRIBUTOR TRAY FOR HEAT EXCHANGE EQUIPMENT

The present invention relates to a liquid distributor tray in heat exchange equipment, mass exchange equipment or reactors having roughly horizontal liquid distributor channels disposed in the tray, which channels, via openings, deliver the liquid downwardly to fingers from which the liquid flows off and/or drips off.

BACKGROUND OF THE INVENTION

In the case of liquid distributor trays in separating columns and mass exchange equipment, it is known to dispose vertical tube sections in the liquid channels in which the liquid stands, which tube sections are provided with small openings through which the liquid flows from the channel into the tube, in order to then flow or drip downwardly onto the lower distributor tray. Furthermore, German Laid-Open Application 3306636 discloses openings in the side walls of liquid distributor channels in a liquid distributor for a counter-current column, in which openings wire pieces are suspended, via which the liquid flows outwardly along the channel wall to downwardly pointing fingers, off which the liquid drips.

OBJECT OF THE INVENTION

The object of the invention is to achieve, even with small amounts of liquid, a uniform and dense trickle irrigation of the tray or the packing layer therebelow.

SUMMARY OF THE INVENTION

This object is achieved according to the invention in that

- below the channel base there is one pot or a plurality of pots which receive the liquid leaving the channel,
- at the lower edge of the pot wall, fingers are attached or are formed, which fingers are bent outwards, and
- above the fingers there are openings in the pot wall, through which openings the liquid passes outwardly and flows down the outer wall of the pot to the fingers.

The liquid passing downwardly from the distributor channel is collected in the pot and is then fed uniformly from the pot to the fingers, so that a highly uniform and dense trickle irrigation is achieved even when only small amounts of liquid are fed. By this means, an optimal action with large, medium and small amounts of liquid is achieved with the simplest design and uniform distribution.

It is particularly advantageous in this case if the channel base has at least one opening above each pot, through which the liquid flows from the channel into the pot. Alternatively, at least one vertical tube can be attached in the channel base above each pot to project above the channel base. By this means, a particularly uniform and controlled downward liquid feed is achieved.

It is particularly advantageous if the tube projects below the channel base and reaches into the pot. A highly uniform transfer of liquid is achieved even with small amounts if a piece of wire is attached in each of the openings of the pot wall, which piece of wire extends downwardly on the outside of the pot wall to the respective finger. In this case, the lower end of the piece of wire can be inserted in an opening of the pot wall which is disposed directly above the respective finger or in the area where the finger begins.

BRIEF DESCRIPTION OF THE DRAWING

The above and other objects, features and advantages of my invention will become more readily apparent from the following description, reference being made to the accompanying highly diagrammatic drawing in which:

FIG. 2 shows a vertical section through the distributor channel with openings in the channel base, through which openings the liquid flows into the pot or pots; and FIG. 3 is a plan view showing a plurality of channels.

SPECIFIC DESCRIPTION

Figure 1:
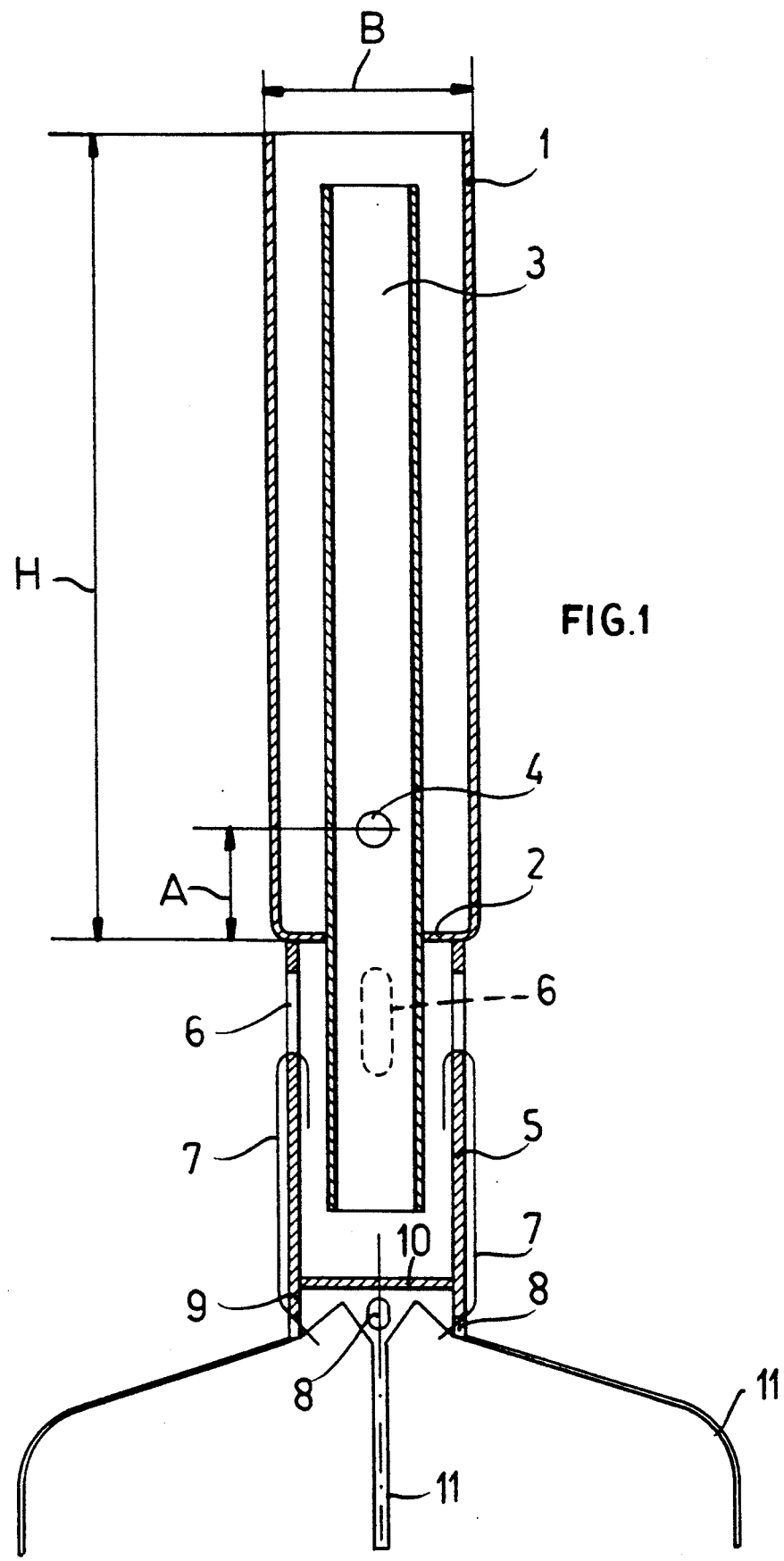
FIG. 1 is a diagrammatic cross sectional view which shows a vertical section through the distributor channel with a tube in the distributor tray for transfer of liquid from the distributor channel to the distributor pot.

A liquid distributor tray in heat exchange equipment, mass exchange equipment or reactors is provided with horizontal liquid distributor channels 1, the height H of which is for the most part greater than their width B and in the channel bases 2 of which tube sections 3 are vertically attached at regular intervals, which tube sections 3 project above and below the channel base. At a distance A from the channel base 2 there is at least one opening 4 in the wall of the tube section 3, through which opening the liquid in the distributor channel 1 can flow into the tube section 3, in order to pass downwardly through the tube section 3.

The lower area of the tube section 3 is surrounded by a pot 5, which is attached by its upper side to the lower side of the channel base 2. The tube section 3 projects into this pot 5, so that the liquid flowing through the opening 4 fills the pot 5 up to a liquid level which is determined by openings 6 in the side wall of the pot 5. The liquid flows through the openings 6 to the outer wall of the pot pieces of wire 7 are suspended in the openings 6 in this area, and project downwards on the outside of the pot 5 from each opening 6. The lower ends of the wires are enclosed in openings 8 which are located in an area 9 of the pot wall, which area projects downwardly beyond the pot base 10.

The pot wall area 9 forms downwardly projecting fingers 11, each of which is located beneath an opening 8 and thus a piece of wire 7, so that the liquid flows out of the openings 6 via the pieces of wire 7 to the fingers 11 and drips off from their ends. The fingers are bent widely out, in order to cover a large area.

The alternative embodiment depicted in FIG. 2 differs from that in FIG. 1 in that, instead of the tube section 3, openings 2a are located in the channel base 2, through which openings the liquid flows from the distributor channel 1 into the pot 5.

We claim:

1. A liquid distributor tray, comprising:
   a plurality of upright channels adapted to receive liquid to be distributed and having a plurality of openings in respective channel bases of said channels;
   a plurality of pots including a pot below each of said openings for receiving liquid passing through said openings from the respective channels;
   at least three outwardly and downwardly bent fingers angularly spaced apart on each of said pots;

at least three holes formed in a wall of each pot, each hole being provided above a respective one of said fingers of the pot and positioned to enable liquid to flow out from the respective pot, down the exterior of said wall thereof and onto said finger, whereby liquid passes off from said fingers, each of said openings communicating directly with an interior of the respective pot;

a respective vertical tube extending through each opening and affixed in a respective channel base above each pot, said tubes projecting above the respective channel bases, said tubes projecting below the respective channel base and reaching into the respective pot; and a piece of wire received in each of the holes of the wall of the pot, extending downwardly along the outside of the wall of the pot and reaching substantially to a respective one of said fingers.

2. The liquid distributor tray defined in claim 1 wherein each of said tubes is provided with an opening in a lateral wall thereof above the respective channel base.

3. The liquid distributor tray defined in claim 1 wherein each of said wires has a lower end received in a passage of the wall of the pot directly above the respective finger.

* * * * *